United States Patent
Perttunen et al.

[11] Patent Number: 5,809,443
[45] Date of Patent: Sep. 15, 1998

[54] FOUR-WHEEL DRIVE TRANSFER CASE CONTROLLER WITH COMPENSATION FOR TIRES WITH DIFFERENT DIAMETERS

[75] Inventors: Karl Victor Perttunen, W. Bloomfield; Patrick William Gibson, Northville, both of Mich.

[73] Assignee: Ford Motor Company, Dearborn, Mich.

[21] Appl. No.: 352,668

[22] Filed: Dec. 9, 1994

[51] Int. Cl.⁶ ........................................... G06F 7/70
[52] U.S. Cl. .................... 701/69; 701/74; 701/89; 701/90; 180/197; 180/233; 180/248; 303/147
[58] Field of Search ............................ 364/424.1, 424.01, 364/424.05, 426.02, 426.03, 426.01, 571.01, 571.04, 565; 180/248, 197, 233, 249, 247, 236, 242, 244, 250; 477/35, 903, 904, 39, 40; 280/9; 303/92, 163, 145, 147; 475/221, 88, 150; 192/52.5, 53.2, 48.3, 4 A, 103 F

[56] References Cited

U.S. PATENT DOCUMENTS

| | | | |
|---|---|---|---|
| 3,656,573 | 4/1972 | Halberg | 180/249 |
| 4,467,886 | 8/1984 | Declaire et al. | 364/424.1 |
| 4,702,341 | 10/1987 | Taga et al. | 364/424.1 |
| 4,715,248 | 12/1987 | Gant | 475/86 |
| 4,718,303 | 1/1988 | Fogelberg | 180/249 |
| 4,773,517 | 9/1988 | Watanabe | 477/175 |
| 4,825,368 | 4/1989 | Itoh et al. | 364/424.1 |
| 4,840,247 | 6/1989 | Kashihara et al. | 180/249 |
| 4,884,653 | 12/1989 | Kouno | 364/424.1 |
| 4,961,476 | 10/1990 | Witte et al. | 180/197 |
| 4,989,686 | 2/1991 | Miller et al. | 180/197 |
| 4,991,678 | 2/1991 | Furuya et al. | 364/424.1 |
| 5,032,995 | 7/1991 | Matsuda et al. | 364/424.03 |
| 5,060,747 | 10/1991 | Eto | 364/424.1 |
| 5,215,160 | 6/1993 | Williams et al. | 180/197 |
| 5,219,038 | 6/1993 | Hamada et al. | 364/424.1 |
| 5,246,278 | 9/1993 | Yoshino et al. | 364/426.02 |
| 5,292,184 | 3/1994 | Takata | 364/426.02 |
| 5,461,568 | 10/1995 | Morita | 364/426.03 |
| 5,473,225 | 12/1995 | Miyazaki | 318/52 |
| 5,479,348 | 12/1995 | Sasaki | 364/426.03 |

FOREIGN PATENT DOCUMENTS

| | | |
|---|---|---|
| 0 298 397 A2 | 1/1989 | Germany . |
| 0 393 596 A2 | 10/1990 | Germany . |

*Primary Examiner*—Jacques Louis-Jacques
*Attorney, Agent, or Firm*—Peter Abolins

[57] ABSTRACT

A four-wheel drive vehicle includes a transfer case for controlling the delivery of power between the front and rear wheels of the vehicle. A clutch in the transfer case controls the amount of power delivered to the front and rear wheels in response to a clutch PulseWidth Modulated (PWM) signal which is generated by an electronic powertrain controller. The powertrain controller receives a first signal which is indicative of the rotational speed of a front driveshaft, which transfers motive power from the transfer case to a pair of front wheels, and a second signal which is indicative of the rotational speed of a rear driveshaft, which transfers motive power from the transfer case to a pair of rear wheels. The powertrain controller compensates for wheels which have a different effective diameter by determining the difference between the first signal and the second signal, filtering the difference to remove low frequency components, and generating the clutch PWM signal as a function of the high frequency components.

3 Claims, 3 Drawing Sheets

FOUR-WHEEL DRIVE TRANSFER CASE CONTROLLER WITH COMPENSATION FOR TIRES WITH DIFFERENT DIAMETERS

FIELD OF THE INVENTION

This invention relates to the field of electronic powertrain controllers and more particularly to the field of four-wheel drive vehicles which utilize an electronic powertrain controller.

BACKGROUND OF THE INVENTION

As many people are aware, four-wheel drive vehicles provide traction often unattainable in two-wheel drive vehicles by delivering power to each of the vehicle's four wheels. Attendant with the added traction provided by four-wheel drive is the added complexity of the drive train required to control and deliver power to all four wheels as opposed to only two wheels. For instance, it is desirable to alter the delivery of power to the front wheels and the rear wheels depending upon whether the vehicle is turning, or is being driven on low traction surfaces such as rain or ice covered surfaces. Other situations which require the alteration of power delivery to certain wheels include the use of a tire of a different effective diameter, such as mini-spare tires which are seeing increasing use due to their smaller size and weight.

The delivery of power between the front wheels and the rear wheels of the vehicle is typically handled by a transfer case mechanism which includes either a mechanically or electronically controlled clutch. The inventors herein have recognized that known transfer case control systems experience problems when at least one of the wheels has a different effective diameter than the other wheels. For instance, in known transfer case control systems, use of a mini-spare tire on the vehicle, causes the clutch in the transfer case to cycle excessively, due to the smaller effective wheel diameter caused by the smaller diameter of the mini-spare. As a result, both vehicle handling and performance suffer.

Accordingly, there is a need for a control mechanism for a transfer case in a four-wheel drive vehicle which transfers power to between the front wheels and rear wheels in a manner which improves handling and performance when the tires on the vehicle have differing diameters.

SUMMARY OF THE INVENTION

It is an object of the present invention to control a four-wheel drive mechanism in a vehicle in a manner which adjusts to differing wheel diameters in order to provide improved vehicle handling and performance.

In accordance with the primary object of the invention, in a preferred embodiment, in a vehicle which includes a front driveshaft for transferring motive power to a front set of wheels and a rear driveshaft for transferring motive power to a rear set of wheels, the amount of power delivered to the front driveshaft and to the rear driveshaft is determined in part by generating a front driveshaft value indicative of the rotational speed of the front driveshaft, and generating a rear driveshaft value indicative of the rotational speed of the rear driveshaft. A difference value which is indicative of a difference between the front driveshaft value and the rear driveshaft value is then generated. The difference value is filtered to generate a filtered difference value to remove low frequency components of the difference value. The amount of power delivered to the front driveshaft and to the rear driveshaft is then controlled as a function of the filtered difference value.

An advantage of certain preferred embodiments is that differences in the diameter of the wheels of the vehicle are taken into account when determining the amount of power to be delivered to the wheels. As a consequence, transfer case clutch cycling is reduced and vehicle handling and performance are improved. The advantages provided by certain preferred embodiments can be most clearly seen when a mini-spare tire is used on the vehicle.

These and other features and advantages of the present invention may be better understood by considering the following detailed description of a preferred embodiment of the invention. In the course of this description, reference will frequently be made to the attached drawings.

DETAILED DESCRIPTION

Figure 1:
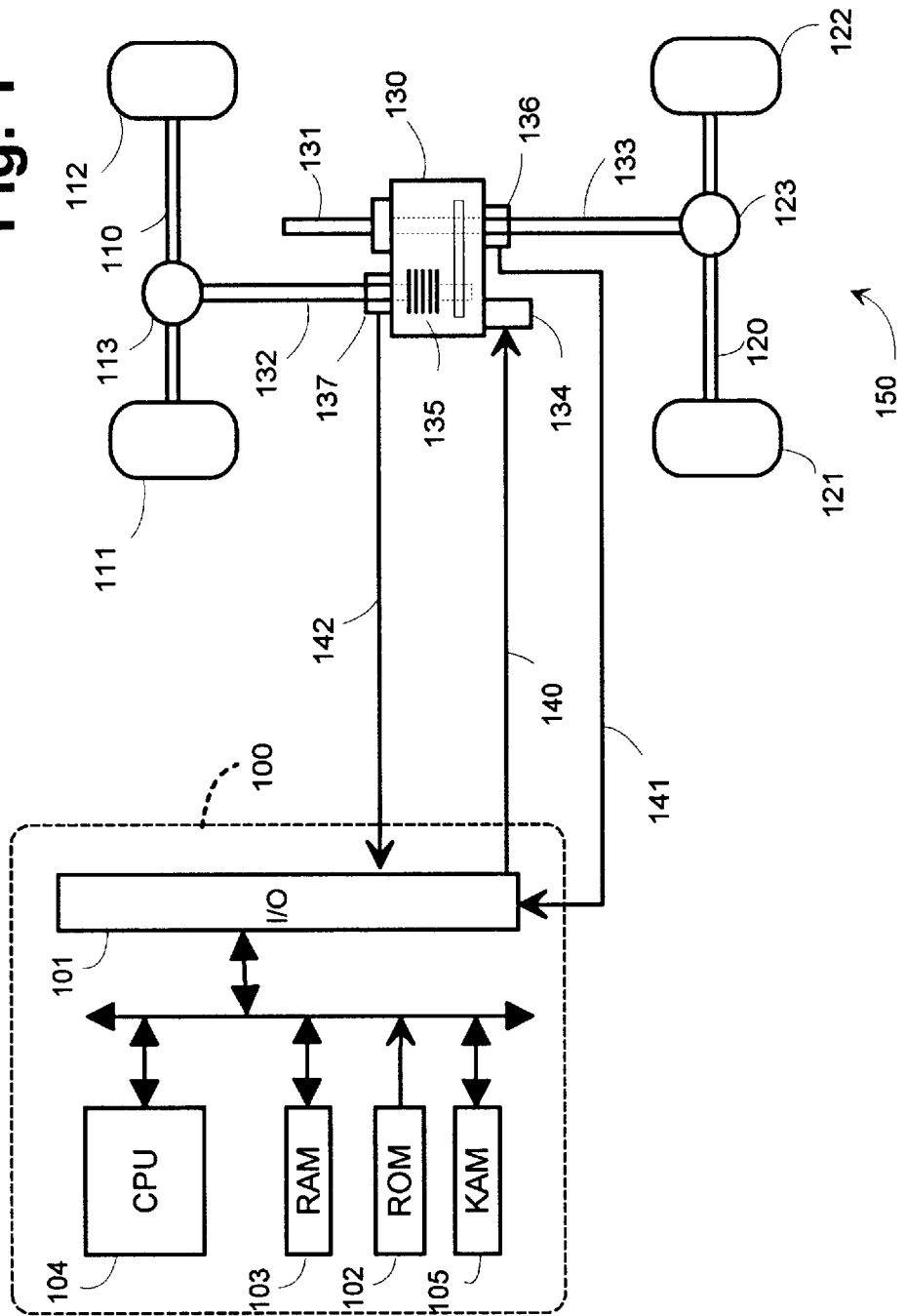
FIG. 1 of the drawings shows a block diagram of a powertrain controller and a four-wheel drive powertrain which embody the principles of the invention.

In FIG. 1 of the drawings a powertrain controller 100 controls the operation of a transfer case 130 of a four-wheel drive vehicle 150. Powertrain controller 100 preferably includes a central processing unit 104, a read-only memory (ROM) 102 for storing control programs, a random-access memory (RAM) 103 for temporary data storage, a keep-alive-memory (KAM) 105 for storing learned values, a conventional data bus and I/O ports 101 for transmitting and receiving signals to and from the transfer case 130. Transfer case 130 includes an electronically controlled clutch 135 for transferring motive power from an input shaft 131, which transmits power from an engine transmission, to front driveshaft 132 and rear driveshaft 133, in response to a clutch PulseWidth Modulated (PWM) signal 140 generated by powertrain controller 100. Transfer case 130 preferably takes a form as described in U.S. Pat. No. 4,718,303 to Mark J. Fogelberg entitled Four Wheel Drive Transfer Case With Clutch Mechanism." Clutch 135 preferably takes a form as described in U.S. Pat. No. 4,989,686 to Miller et al. entitled "System For Controlling Torque Transmission In A Four Wheel Drive Vehicle", which is hereby incorporated by reference. As described in U.S. Pat. No. 4,989,686 clutch 135 takes the form of an electromagnetic clutch which operates in accordance with a clutch PWM signal which controls the amount of slippage between friction plates of the clutch by altering a magnetic field causing movement of an apply plate which engages the friction plates, thereby controlling the amount of power delivered from the input shaft 131 to the front and rear driveshafts. As described by Miller et al., the clutch when engaged, either fully or partially, preferably operates to add torque to the slower turning of the two driveshafts (front or rear) and to subtract torque from the faster turning driveshaft.

Front driveshaft 132 provides motive power to a front differential 113 which controls the amount of motive power delivered over a pair of front wheel shafts to a left front wheel 111 and a right front wheel 112. Rear driveshaft 133 provides motive power to a rear differential 123 which controls the amount of motive power delivered over a pair of wheel shafts to a left rear wheel 121 and a right rear wheel 122.

A front driveshaft speed sensor 137 detects the rotational speed of the front driveshaft 132 and transmits a front driveshaft speed signal 142 to powertrain controller 100. A rear driveshaft speed sensor 136 detects the rotational speed of the rear driveshaft 133 and transmits a rear driveshaft speed signal 141 to powertrain controller 100. Sensors 137 and 136 are preferably conventional magnetic type sensors which transmit a pulse in response to rotation of each tooth, on a gear or rotor secured to turn with the driveshaft, past the sensor. Thus, the frequency of signals 141 and 142 are proportional to the rotational speed of the respective driveshaft.

Figure 3:
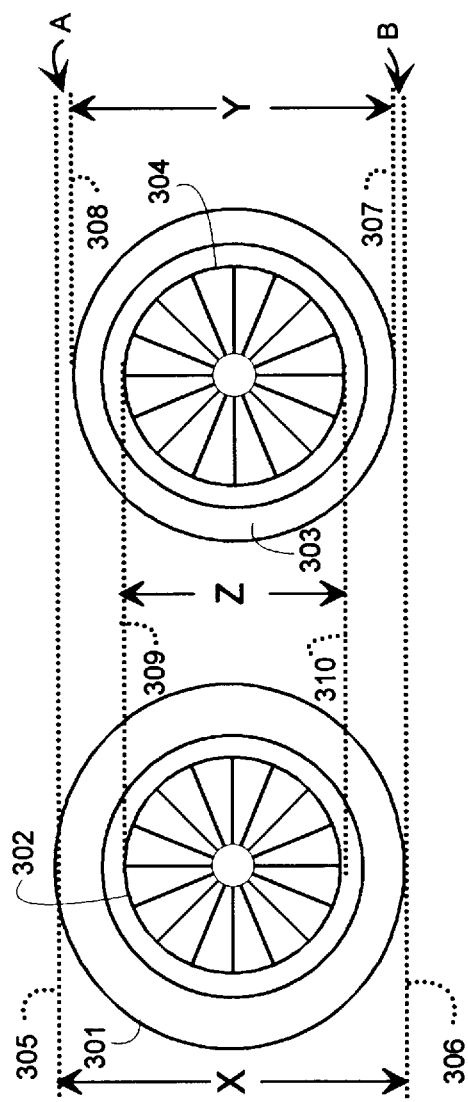
FIG. 3 is a diagram illustrating differing effective wheel diameters.

A preferred embodiment of the present invention advantageously generates clutch PWM signal 140 in a manner which adjusts the amount of power delivered by front driveshaft 132 and rear driveshaft 133 to compensate for differing effective diameters of wheels 111, 112, 121 or 122. As will be appreciated by those skilled in the art in view of the present disclosure, the wheels of a vehicle may have differing effective diameters if a mini-spare, which has a smaller diameter than the tires normally used on the vehicle is present on one wheel. Such a situation may also occur if tires on the wheels are inflated to different pressures or if the material of the tires flex differently. FIG. 3 shows a wheel 302 and tire 301 combination which has an effective wheel diameter X as delineated by lines 305 and 306. FIG. 3 also shows a wheel 304 and tire 303 combination which has an effective wheel diameter Y as delineated by lines 307 and 308. In FIG. 3, wheels 304 and 302 each have a radius of Z as delineated by lines 309 and 310. The effective wheel diameter of the two wheel and tire combinations however differs due to the diameters of the two tires, 301 and 303. As mentioned above, such a situation may occur if tires 301 and 303 are inflated to different air pressures or if the tires exhibit different flexing characteristics thus causing a different diameter even though the air pressure may be the same as in other tires. The wheel and tire combinations may also have differing effective wheel diameters if the wheels 302 and 304 are of different diameters. Such a situation may occur most commonly if mini-spare tire is used. Other mini-spare tires may present a situation as shown in FIG. 3 where the wheel diameter is the same as other wheels but the tire diameter is smaller than that of other tires. As used herein, the term effective wheel diameter is understood to be the outside diameter of a wheel and tire combination as shown at X or Y in FIG. 3.

Figure 2:
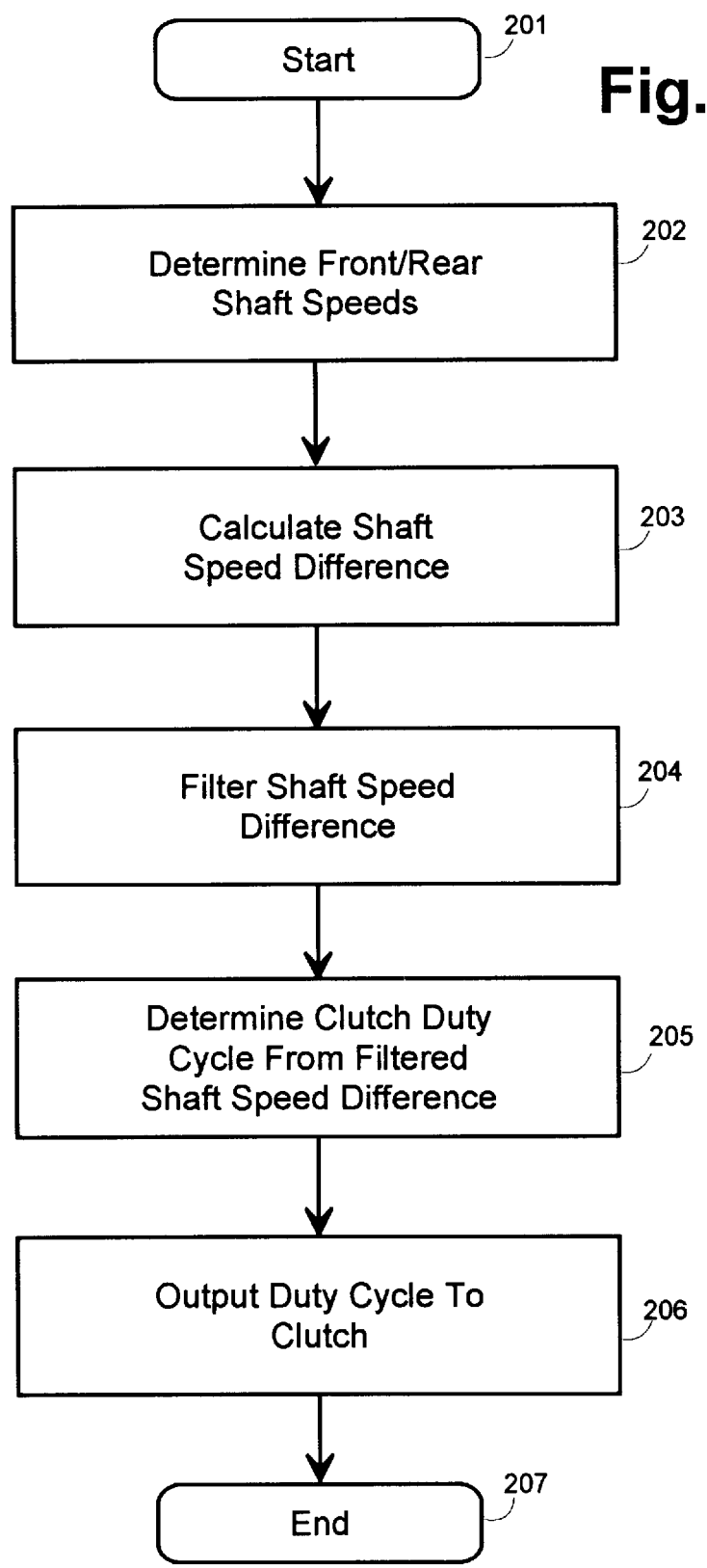
FIG. 2 is a flowchart of the steps executed in a preferred embodiment.

FIG. 2 of the drawings shows the steps of a wheel diameter compensation routine which is executed by powertrain controller 100 as a portion of a stored program to compensate for differing effective wheel diameters.

The wheel diameter compensation routine is initiated at 201 and at 202, a front driveshaft value, which is indicative of the rotational speed of the front driveshaft is generated as a function of information contained on front driveshaft speed signal 142. Also at step 202 a rear driveshaft value, which is indicative of the rotational speed of the rear driveshaft is generated as a function of information contained on rear driveshaft speed signal 142. At step 203, a difference value which is indicative of a difference between the front driveshaft value and the rear driveshaft value is generated. At step 204, the difference value is filtered to remove low frequency components. As will be appreciated by those skilled in the art in view of the present disclosure, removal of low frequency components from the difference value results in a value which is indicative of high frequency differences between the rotational speed of the front driveshaft and the rotational speed of the rear driveshaft. Thus, for a vehicle which has one wheel with a smaller effective wheel diameter than the others and is traveling in a straight line at a steady speed, the difference value may indicate a difference in the rotational speeds of the front and rear driveshaft. However, the difference value will be comprised only of low frequency components and the filtered difference value generated at step 204 will indicate that no change in the rotational speeds of the front driveshaft and the rear driveshaft is required. However, when transient conditions, such as vehicle turning and low traction surfaces, cause rapid changes in the rotational speeds of the front and rear driveshafts, the filtered difference value will reflect the high frequency differences in the rotational speeds of the front and rear driveshafts.

Filtering of the difference value is advantageously performed by a first order high pass filter which has a transfer function Y(s), in the S-domain as shown below:

$$Y(s) = \frac{s}{s+a}$$

Transforming the above S-domain equation into the digital time domain yields the following relationship:

$$y(k)=u(k)-(1-\beta)*u(k)+\beta*y(k-1)$$

where,
u(k) corresponds to the difference value;
y(k) corresponds to the filtered value;
$\beta=e^{-a*T}$;
$\alpha=2\pi*fc$;
fc=corner frequency of the filter; and
T=an amount of time elapsed between execution of the wheel diameter compensation routine and a subsequent execution of the routine. In a preferred embodiment, T has a value of approximately twenty milliseconds, fc has a value of one hertz, and β has a value of 0.88.

At 205, clutch PWM signal 140 is generated as a function of the filtered value. Clutch PWM signal 140 is a fixed frequency signal with a duty cycle which is altered to have a duty cycle of zero when the rotational speeds of the front and rear driveshafts are equal. When the filtered value indicates a difference in rotational speed between the front and rear driveshafts, the duty cycle of clutch PWM signal 140 increases at a fixed interval to 100%, or until the filtered value indicates no high frequency differences between the rotational speeds of the front and rear driveshafts. Clutch PWM signal 140 preferably takes the form of a series of pulses, which has a fixed frequency, and a duty cycle which varies to determine the amount of slippage in clutch 135.

It is to be understood that the specific mechanisms and techniques which have been described are merely illustrative of one application of the principles of the invention. Numerous modifications may be made to the methods and apparatus described without departing from the true spirit and scope of the invention.

What is claimed is:

1. In a vehicle which includes a front driveshaft for transferring motive power to a front set of wheels, a rear driveshaft for transferring motive power to a rear set of wheels and an electronically controlled clutch which controls the amount of power delivered to said front driveshaft and to said rear driveshaft in accordance with a pulse width modulated signal which controls the amount of power transferred from a transmission to said front driveshaft via said clutch, a method of controlling the amount of power delivered to said front driveshaft and to said rear driveshaft, comprising, in combination, the steps of:

generating a front driveshaft value indicative of the rotational speed of said front driveshaft;

generating a rear driveshaft value indicative of the rotational speed of said rear driveshaft;

generating a difference value indicative of a difference between said front driveshaft value and said rear driveshaft value;

generating a filtered difference value by filtering said difference value to remove low frequency components of said difference value by generating said filtered difference value according to the following relationship:

$$y(k)=u(k)-(1-\beta)*u(k)+\beta*y(k-1)$$

where, y(k) is the filtered difference value;

u(k) is the difference value;

$\beta=e^{-a*T}$;

$\alpha=2\pi*fc$;

ƒc=is a predetermined corner frequency of the filter; and

T=an amount of time elapsed between a prior execution of said method and the present execution of said method; and controlling the amount of power delivered to said front driveshaft and to said rear driveshaft, as a function of said filtered difference value.

2. A vehicle powertrain controller comprising:

means responsive to a front driveshaft speed value, which is indicative of the rotational speed of a front driveshaft of said vehicle, and to a rear driveshaft speed value, which is indicative of the rotational speed of a rear driveshaft of said vehicle, for determining a difference value as a function of a difference between said front driveshaft speed value and said rear driveshaft speed value said front driveshaft and said rear driveshaft being responsive to an electronically controlled clutch which controls the amount of power delivered to said front driveshaft and to said rear driveshaft in accordance with a pulse width modulated signal which controls the amount of power transferred from a transmission to said front driveshaft via said clutch;

means for filtering said difference value to generate a filtered value indicative of high frequency differences between said front driveshaft speed value and said rear driveshaft speed value, said filtered valued being generated in accordance with the following relationship:

$$y(k)=u(k)-(1-\beta)*u(k)+\beta*y(k-1)$$

where, y(k) is the filtered value;

u(k) is the difference value;

$\beta=e^{-a*T}$;

$\alpha=2\pi*fc;$

ƒc=is a predetermined corner frequency of the filter; and

T=an amount of time elapsed between generation of a prior value for said filtered difference value and generation of a present value for said filtered difference value;

means responsive to said filtered value for generating a pulse width modulated duty cycle value indicative of an amount of power to be transferred to said front driveshaft and to said rear driveshaft to eliminate said high frequency differences.

3. A vehicle powertrain controller for controlling delivery of power to four wheels of a vehicle, each of the wheels being characterized by an effective wheel diameter, comprising:

means, responsive to a first speed signal generated by a sensor positioned to detect the rotational speed of a front driveshaft, for generating a front driveshaft speed value, which is indicative of the rotational speed of said front driveshaft;

means, responsive to a second speed signal generated by a sensor positioned to detect the rotational speed of a rear driveshaft, for generating a rear driveshaft speed value, which is indicative of the rotational speed of said rear driveshaft;

electronically controlled clutch, included in said vehicle, which controls the amount of power delivered to said front driveshaft and to said rear driveshaft in accordance with a pulse width modulated signal which controls the amount of power transferred from a transmission to said front driveshaft via said clutch; and means for compensating for differences in effective wheel diameter between the wheels of the vehicle comprising;

means, responsive to said front driveshaft speed value and to said rear driveshaft speed value, for generating a shaftspeed difference value which is indicative of a difference in rotational speed of said front driveshaft and said rear driveshaft;

means for filtering said shaftspeed difference value, in order to generate a filtered shaftspeed difference value which is indicative of high frequency differences between the rotational speed of said front driveshaft and said rear driveshaft, by filtering said shaftspeed difference value to remove low frequency components of said difference value by generating said filtered difference value according to the following relationship:

$$y(k)=u(k)-(1-\beta)*u(k)+\beta*y(k-1)$$

where, y(k) is the filtered difference value;

u(k) is the difference value;

$\beta=e^{-a*T}$;

$\alpha=2\pi*fc$;

ƒc=is a predetermined corner frequency of the filter; and

T=an amount of time elapsed between generation of a prior value for said filtered difference value and generation of a present value for said filtered difference value; and means for generating, as a function of said filtered shaftspeed value, a power transfer value which is indicative of an amount by which power transferred to said front driveshaft and to said rear driveshaft is to be altered to eliminate the high frequency differences between the rotational speed of said front driveshaft and said rear driveshaft.

* * * * *